US009916415B2

(12) United States Patent
Anderson et al.

(10) Patent No.: US 9,916,415 B2
(45) Date of Patent: Mar. 13, 2018

(54) INTEGRATED CIRCUIT PERFORMANCE MODELING THAT INCLUDES SUBSTRATE-GENERATED SIGNAL DISTORTIONS

(71) Applicant: GLOBALFOUNDRIES INC., Grand Cayman (KY)

(72) Inventors: Frederick G. Anderson, South Burlington, VT (US); Michael L. Gautsch, Jericho, VT (US); Jean-Marc Petillat, Draveil (FR); Philippe Ramos, Paontault Combault (FR); Randy L. Wolf, Essex Junction, VT (US); Jiansheng Xu, Essex Junction, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 75 days.

(21) Appl. No.: 15/095,239

(22) Filed: Apr. 11, 2016

(65) Prior Publication Data

US 2017/0293709 A1    Oct. 12, 2017

(51) Int. Cl.
*G06F 17/50* (2006.01)
*H01L 27/12* (2006.01)

(52) U.S. Cl.
CPC ...... *G06F 17/5081* (2013.01); *G06F 17/5009* (2013.01); *G06F 2217/12* (2013.01); *H01L 27/1211* (2013.01)

(58) Field of Classification Search
CPC ............ G06F 17/5036; G06F 17/5022; G06F 17/5031; G06F 2217/84; G06F 17/5068;
(Continued)

(56) References Cited

U.S. PATENT DOCUMENTS 5,682,336 A * 10/1997 Chian ................. G06F 17/5036
703/3
6,291,322 B1    9/2001 Clement
(Continued)

OTHER PUBLICATIONS

Wen-Kuan Yeh et al., "Substrate Noise-Coupling Characterization and Efficient Suppression in CMOS Technology", IEEE Transactions on Electron Devices, vol. 51, No. 5, May 2004, pp. 817-819.
(Continued)

*Primary Examiner* — Nghia Doan
(74) *Attorney, Agent, or Firm* — Gibb & Riley, LLC; Michael J. LeStrange, Esq.

(57) ABSTRACT

Disclosed are embodiments for modeling integrated circuit (IC) performance. In these embodiments, a parasitic extraction process is performed to generate a netlist that, not only accounts for various parasitics within the IC, but also accounts for substrate-generated signal distortions (e.g., substrate-generated harmonic signal distortions) that occur within the IC. During this netlist extraction process, the design layout of the IC is analyzed to identify parasitics that are to be represented in the netlist and to also identify any circuit elements with output signals that are subject to substrate-generated signal distortions. When such circuit elements are identified, signal distortion models, which were previously empirically determined and stored in a model library, which correspond to the identified circuit elements, and which account for the signal distortions, are selected from the model library and incorporated into the netlist. Simulations are subsequently performed using this netlist to generate a performance model for the IC.

18 Claims, 5 Drawing Sheets

(58) Field of Classification Search
CPC ............. G06F 17/5081; G06F 17/5009; G06F 2217/82; G06F 2217/78
USPC .......................... 716/106–109, 115, 132–134
See application file for complete search history.

(56) References Cited

U.S. PATENT DOCUMENTS

| | | | |
|---|---|---|---|
| 8,674,472 | B2 | 3/2014 | Botula et al. |
| 8,698,244 | B2* | 4/2014 | Botula ................... H01L 21/84 257/347 |
| 8,709,903 | B2 | 4/2014 | Botula et al. |
| 2001/0041428 | A1 | 11/2001 | Clement |
| 2007/0067747 | A1* | 3/2007 | Checka ............... G06F 17/5036 716/115 |
| 2008/0028353 | A1* | 1/2008 | Lu ....................... G06F 17/5036 716/115 |
| 2011/0127529 | A1 | 6/2011 | Botula et al. |

OTHER PUBLICATIONS

Balsha R. Stanisic et al., "Addressing Substrate Coupling in Mixed-Mode IC's: Simulation and Power Distribution Synthesis", IEEE Journal of Solid-State Circuits, vol. 29, No. 3, Mar. 1994, pp. 226-238.

R.W. Dutton et al., Device Simulation for RF Applications, Electron Devices Meeting, IEDM 1997, Technical Digest International, pp. 301-304.

Y. Morandini et al., Characterization of MOS Varactor with large signal Network Analyser (LSNA) in CMOS 65nm bulk and SOI technologies, ARFTG Conference, 2007 69th , pp. 1-4.

Marc Van Heijiningen et al., "High-Level Simulation of Substrate Noise Generation Including Power Supply Noise Coupling" (Design Automation Conference, 2000. Proceedings 2000Year: 2000, pp. 446-451.

Luis Miguel Silveira et al., "Characterizing Substrate Coupling in Deep-Submicron Designs", Substrate Coupling, IEEE Design & Test of Computers, 2002, pp. 4-15.

Mitra, Substrate-Aware Mixed-Signal Macrocell Placement in Wright (IEEE Journal of Solid-State Circuits, vol. 30, No. 3, Mar. 1995, pp. 269-278.

Patrick Birrer, "Silencer! A Tool for Substrate Noise Coupling Analysis" An Abstract of the Thesis for the degree of Master of Science in Electrical and Computer Engineering presented on Jan. 9, 2004, pp. 1-149.

Ranjit Gharpurey et al., "Substrate Coupling: Modeling, Simulation and Design Perspectives" (Quality Electronic Design, 2004, Proceedings. 5th International Symposium on Year: 2004, pp. 283-290.

A. Cerdeira, "New method for Determination of Harmonic Distortion in SOI FD Transistors", Solid State Electronics, vol. 46, 2002, pp. 103-108.

SIMUCAD Application Note "Parasitic Back Annotation for Post Layout Simulation", Application Note 2-010, pp. 1-5.

* cited by examiner

INTEGRATED CIRCUIT PERFORMANCE MODELING THAT INCLUDES SUBSTRATE-GENERATED SIGNAL DISTORTIONS

FIELD OF THE INVENTION

The present invention relates to modeling the performance of an integrated circuit (IC) and, more particularly, to a system, a method and a computer program product for modeling the performance of an integrated circuit (IC), including substrate-generated signal distortions, such as substrate-generated harmonic signal distortions.

BACKGROUND

Signal distortions can give rise to magnitude and phase errors and, thus, can negatively impact integrated circuit performance. For example, harmonic signal distortions are generated on a signal at an output of a circuit element (e.g., at an output of a metal or polysilicon signal wire or device) when the load at the input to that circuit element is non-linear. The magnitude of the distortion will depend upon the relative size of the non-linear load, the characteristics of the circuit element at issue and the source impedance. Harmonic distortion can change the shape of the output waveform of a signal from the fundamental waveform to a more complex shape and, thus, can impact the signal integrity such that the signal becomes misunderstood by a receiver. Additionally, the Federal Communications Commission (FCC) has set limits (i.e., specifications) on harmonics generation in radio (RE) applications to reduce interference between signals. Unfortunately, current integrated circuit performance modeling techniques do not adequately model substrate-generated signal distortions and, particularly, substrate-generated harmonic signal distortions. Therefore, there is a need in the art for an improved integrated circuit performance modeling technique that includes substrate-generated signal distortions and, particularly, substrate-generated harmonic signal distortions.

SUMMARY

In view of the foregoing, disclosed herein are embodiments of a method, system and computer program product for modeling the performance of an integrated circuit (IC). In these embodiments, a parasitic extraction process can be performed to generate a layout-extracted netlist that, not only accounts for various parasitics (e.g., various parasitic capacitances and resistances) within the IC, but also accounts for substrate-generated signal distortions (e.g., substrate-generated harmonic signal distortions) that occur within the IC. Specifically, during the netlist extraction process, the design layout of the IC can be analyzed to identify parasitics that are to be represented in the layout-extracted netlist and to also identify any circuit elements with output signals that are subject to substrate-generated signal distortions. When such circuit elements are identified, signal distortion models, which were previously empirically determined and stored in a model library, which correspond to the identified circuit elements, and which account for the signal distortions, can be selected from the model library and incorporated into the layout-extracted netlist. Simulations can subsequently be performed using this layout-extracted netlist to generate a performance model for the IC.

More particularly, disclosed herein is an associated method for modeling the performance of an integrated circuit (IC).

In the method, a design layout for an integrated circuit (IC) in a specific technology node can be stored in a memory. In this IC, various circuit elements can be laid out above a semiconductor substrate (e.g., a semiconductor-on-insulator (SOI) substrate) such that substrate-generated signal distortions may occur. Such substrate-generated signal distortions can, for example, be harmonic signal distortions that occur at the output of signal wires within the metal levels or polysilicon (PC) level of the IC due to non-linear capacitive coupling with the semiconductor substrate (i.e., due to non-linear signal wire-to-substrate capacitive coupling), harmonic signal distortions that occur at the output of semiconductor devices due to device-to-device coupling, which is characterized by both non-linear capacitive coupling of the semiconductor devices to the semiconductor substrate and non-linear resistance through the portion of the semiconductor substrate between the semiconductor devices, or any other substrate-generated signal distortions.

In the method, a model library can also be stored in the memory. The model library can include multiple level-specific signal distortion models, which were previously empirically determined. Each of these level-specific signal distortion models can be specific to circuit elements in a specific one of the multiple different levels of the IC above the semiconductor substrate (e.g., in the semiconductor layer level, also referred to herein as the device level, the PC level, and/or the different metal levels above the semiconductor layer from the first metal level to the last metal level). That is, each level-specific signal distortion model can be associated with a specific level of the IC above the semiconductor substrate. Additionally, each level-specific signal distortion model can include a schematic representation that accounts for substrate-generated signal distortions (e.g., the substrate-generated harmonic signal distortions) that will occur on a signal at the output of a circuit element within that specific level of the IC.

In the method, a layout-extracted netlist for the IC can be generated (e.g., by a processor in communication with the memory) based on the IC design layout and using the model library. This netlist can specifically be generated such that it, not only accounts for various parasitics (e.g., various parasitic capacitances and resistances) within the IC, but also accounts for substrate-generated signal distortions (e.g., substrate-generated harmonic signal distortions) that occur within the IC. Specifically, the process of generating the layout-extracted netlist can include analyzing the IC design layout in order to identify parasitics that are to be represented in the layout-extracted netlist and also to identify circuit elements with output signals that are subject to signal distortions due to coupling with or passing through the semiconductor substrate (e.g., coupling characterized by non-linear capacitive coupling with the semiconductor substrate and/or non-linear resistance through the semiconductor substrate) as well as the corresponding levels within the IC of those identified circuit elements. Next, signal distortion models for the identified circuit elements, respectively, can be selected from the model library based on the corresponding levels and those signal distortion models can be incorporated into the layout-extracted netlist in order to account for the signal distortions.

After the layout-extracted netlist is generated, simulations can be performed (e.g., by the processor) using this layout-extracted netlist in order to generate a performance model of the IC.

Also disclosed herein is a system for modeling the performance of an integrated circuit (IC).

This system can incorporate at least one memory and at least one processor in communication with the memory.

The memory can store a design layout for an integrated circuit (IC) in a specific technology node. In this IC, various circuit elements can be laid out above a semiconductor substrate (e.g., a semiconductor-on-insulator (SOI) substrate) such that substrate-generated signal distortions may occur. Such substrate-generated signal distortions can, for example, be harmonic signal distortions that occur at the output of signal wires within the metal levels or polysilicon (PC) level of the IC due to non-linear capacitive coupling with the semiconductor substrate (i.e., due to non-linear signal wire-to-substrate capacitive coupling), harmonic signal distortions that occur at the output of devices with active regions due to device-to-device coupling, which is characterized by both non-linear capacitive coupling of the semiconductor devices to the semiconductor substrate and non-linear resistance through the portion of the semiconductor substrate between the semiconductor devices, or any other substrate-generated signal distortions.

The memory can also store a model library and this model library can include multiple level-specific signal distortion models, which were previously empirically determined. Each of these level-specific signal distortion models can be specific to circuit elements in a specific one of the multiple different levels of the IC above the semiconductor substrate (e.g., the semiconductor layer level, also referred to herein as the device level, the PC level, and/or the different metal levels above the semiconductor layer from the first metal level to the last metal level). That is, each level-specific signal distortion model can be associated with a specific level of the IC above the semiconductor substrate. Additionally, each level-specific signal distortion model can include a schematic representation that accounts for substrate-generated signal distortions (e.g., the substrate-generated harmonic signal distortions) that will occur on a signal at the output of a circuit element within that specific level of the IC.

Based on the IC design layout and using the model library, the processor can generate a layout-extracted netlist for the IC that, not only accounts for various parasitics (e.g., various parasitic capacitances and resistances) within the IC, but also accounts for substrate-generated signal distortions (e.g., substrate-generated harmonic signal distortions) that occur within the IC. Specifically, the processor can perform the following processes in order to generate the layout-extracted netlist. The processor can analyze the IC design layout to identify any parasitics that are to be represented in the layout-extracted netlist and to also identify any circuit elements with output signals that are subject to signal distortions due to coupling with or passing through the semiconductor substrate (e.g., coupling characterized by non-linear capacitive coupling with the semiconductor substrate and/or non-linear resistance through the semiconductor substrate) as well as the levels within the IC of those identified circuit elements. Next, the processor can select, from the model library, signal distortion models for the identified circuit elements, respectively, based on the corresponding levels. Then, the processor can incorporate those signal distortion models into the layout-extracted netlist in order to account for the signal distortions.

After the layout-extracted netlist is generated, the processor can perform simulations using this layout-extracted netlist in order to generate a performance model of the IC.

Also disclosed herein is a computer program product. This computer program product can include a computer readable storage medium with program instructions embodied therewith (e.g., stored thereon). The program instructions can be executable by a processor to cause the processor to perform the above-described method.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1:
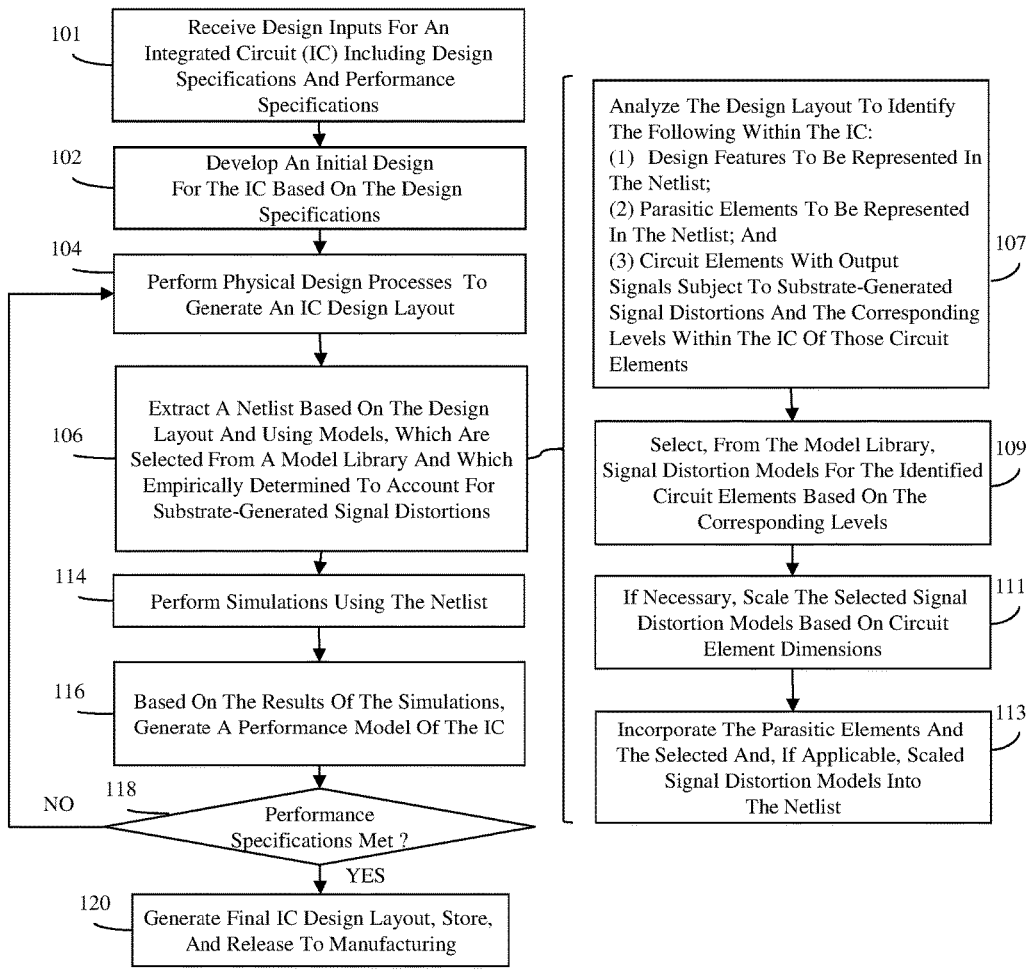
FIG. 1 is a flow diagram illustrating an integrated circuit (IC) design method that provides for substrate-generated signal distortion-aware IC performance modeling.

As mentioned above, harmonic signal distortions are generated on a signal at an output of a circuit element (e.g., at an output of a metal or polysilicon signal wire or device) when the load at the input to that circuit element is non-linear. The magnitude of the distortion will depend upon the relative size of the non-linear load, the characteristics of the circuit element at issue and the source impedance. Such harmonic signal distortions can be substrate-generated and are prevalent in semiconductor-on-insulator (SOI) structures (e.g., silicon-on-insulator structures).

Specifically, SOI structures typically include a semiconductor substrate, a buried insulator layer (e.g., a buried oxide (BOX) layer) above the semiconductor substrate, and a semiconductor layer (i.e., a silicon layer or other semiconductor layer in which the active regions of semiconductor devices are formed) above the insulator layer. With SOI structures, a positive fixed charge can be trapped within the insulator layer and can attract electrons to the interface between the insulator layer and the semiconductor substrate, thereby forming an inversion charge layer (also referred to as an accumulation layer) with a negative charge at that interface. Voltage signals, which are produced by semiconductor devices (e.g., field effect transistors) with active regions in the semiconductor layer, can cause non-linear variations in the magnitude of the negative charge of the inversion charge layer. These variations can cause non-linear variations in the resistance of the inversion charge layer with the semiconductor substrate (i.e., substrate resistance) and non-linear variations in the capacitive coupling between signal wires (e.g., back end of the line (BEOL) signal wires or polysilicon signal wires) and the semiconductor substrate (i.e., in signal wire-to-substrate capacitive coupling). Such non-linear variations in substrate resistance and in signal wire-to-substrate capacitance coupling can result in the generation of harmonic signal distortions, including second and third order harmonics, at the outputs of the signal wires. Those skilled in the art will recognize that a first order harmonic refers to a fundamental waveform with a fundamental frequency and, particularly, no distortion. The higher order harmonics have waveforms with frequencies that are multiples of the fundamental frequency. For example, a second order harmonic is typically seen with a linear change in impedance (i.e., when impedance is a function of the input signal), a third order harmonic is typically seen with a quadratic change in impedance (i.e., when impedance is a function of the square of the input signal), and so on. Thus, these harmonic signal distortions can change the shape of the output waveform from the fundamental waveform to a more complex shape. Non-linear variations in substrate resistance and in device-to-device capacitive coupling through the semiconductor substrate can similarly result in the generation of harmonic signal distortions, including second and third order harmonics, at the outputs of the semiconductor devices.

For purposes of illustration, harmonic signal distortions were described above with respect to semiconductor-on-insulator (SOI) structures. However, those skilled in the art will recognize that such harmonic signal distortions can similarly occur in integrated circuits formed on bulk semiconductor structures, due to well regions formed between upper and lower portions of the semiconductor substrate.

In any case, harmonic distortion can change the shape of the output waveform of a signal from the fundamental waveform to a more complex shape and, thus, can impact the signal integrity such that the signal becomes misunderstood by a receiver. Additionally, the Federal Communications Commission (FCC) has set limits (i.e., specifications) on harmonics generation in radio (RF) applications to reduce interference between signals. Unfortunately, current integrated circuit performance modeling techniques do not adequately model substrate-generated signal distortions and, particularly, substrate-generated harmonic signal distortions. Specifically, current integrated circuit performance modeling techniques perform simulations based on a layout-extracted netlist that includes parasitic capacitive elements with fixed capacitance values representing signal wire-to-substrate capacitances and device-to-device capacitances and a fixed resistance value representing substrate resistance. Thus, these techniques do not account for non-linear variable capacitances and resistances caused by the inversion layer and, hence, do not account for harmonic generation.

In view of the foregoing, disclosed herein are embodiments of a method, system and computer program product for modeling the performance of an integrated circuit (IC). In these embodiments, a parasitic extraction process can be performed to generate a layout-extracted netlist that, not only accounts for various parasitics (e.g., various parasitic capacitances and resistances) within the IC, but also accounts for substrate-generated signal distortions (e.g., substrate-generated harmonic signal distortions) that occur within the IC. Specifically, during a netlist extraction process, the design layout of the IC can be analyzed to identify parasitics that are to be represented in the netlist and to also identify any circuit elements with output signals that are subject to substrate-generated signal distortions. When such circuit elements are identified, signal distortion models, which were previously empirically determined and stored in a model library, which correspond to the identified circuit elements, and which account for the signal distortions, can be selected from the model library and incorporated into the layout-extracted netlist. Simulations can subsequently be performed using this layout-extracted netlist to generate a performance model for the IC.

More particularly, referring to FIG. 1, disclosed herein is an integrated circuit (IC) design method that provides for substrate-generated signal distortion-aware IC performance modeling.

The method can, for example, be implemented in the design of an integrated circuit (IC) at a specific technology node (e.g., 32 nm silicon-on-insulator (SOI), 22 nm SOI, etc.). In the method, design inputs and, particularly, design specifications and performance specifications for an IC can be received (e.g., by a processor from a designer via a graphic user interface (GUI)) (101). The performance specifications can include, for example, requirements for behavior characteristics, requirements for current-voltage (I-V) characteristics, requirements setting limits on harmonics, etc. These inputs can be stored in memory (e.g., on a data storage device accessible by the processor) and an initial design for the IC can, for example, be developed by a designer based on the design specification (102). This initial design can be represented by a high-level description, which sets out the requirements for the IC. This high-level description can be stored in memory in, for example, a hardware description language (HDL), such as VHDL or Verilog. Those skilled in the art will recognize that this high-level description will set out specifications for various parameters (e.g., for channel length, channel width, doping, spacer width, etc.).

Following development of the initial IC design, physical design processes can be performed in order to generate an IC design layout for the IC (104). These physical design processes can include, but are not limited to, logic synthesis, floorplanning, power planning and input/output pin placement, library element placement, clock tree synthesis and wire routing. Such physical design processes are well known in the art and, thus, the details of those processes are omitted from this specification in order to allow the reader to focus on the salient aspects of the disclosed method. The IC design layout can be stored in memory (106).

Figure 2:
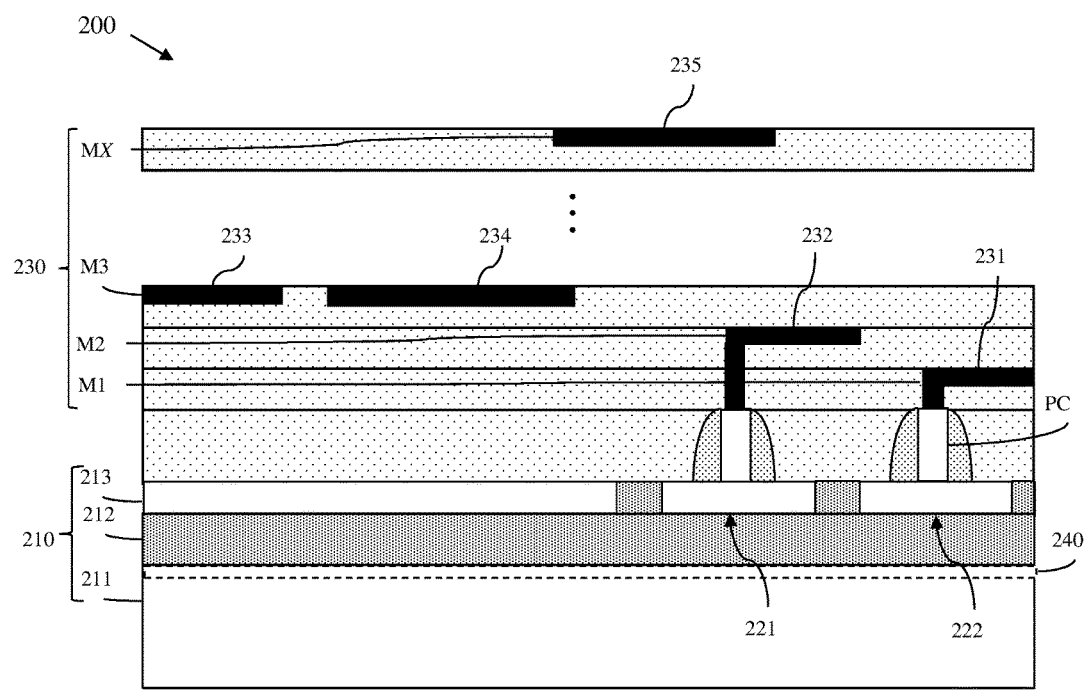
FIG. 2 is a cross-section diagram illustrating a portion of an IC design layout for an exemplary IC that can be designed and processed using the embodiments disclosed herein.

FIG. 2 is a cross-section diagram illustrating a portion of an IC design layout for an exemplary IC 200 that can be designed and processed using the embodiments disclosed herein. As illustrated, this IC 200 can be a semiconductor-on-insulator (all) structure. That is, the IC 200 can be designed for formation on a semiconductor-on-insulator (SOI) wafer 210. Such a semiconductor-on-insulator wafer 210 can include a semiconductor substrate 211 (e.g., a silicon substrate or any other suitable semiconductor substrate), an insulator layer 212 (e.g., a silicon oxide layer or any other suitable insulator layer on the semiconductor substrate 211) and a semiconductor layer 213 (e.g., a silicon layer or any other suitable semiconductor layer) on the insulator layer 212. The IC 200 can further have various circuit elements laid out at different levels above the semiconductor substrate 211. The circuit elements can include, for example, semiconductor devices with active regions in semiconductor layer 213 and gates in the polysilicon level (PC level) (e.g., see field effect transistors 221 and 222). The circuit elements can also include polysilicon signal wires (not shown), such as resistors, waveguides, or any other type of polysilicon signal wires, in the PC level. The circuit elements can also include, for example, signal wires in different ones of the back end of the line (BEOL) metal levels 230 above the semiconductor devices (e.g., see signal wire 231 in the first metal level M1, which is closest to the semiconductor substrate 211; signal wire 232 in the second metal level M2, signal wires 233 and 234 in the third metal level M3; and signal wire 235 in the last metal level MX, which is the farthest metal level from the semiconductor substrate).

At least some of the circuit elements mentioned above can have output signals that are subjected to substrate-generated signal distortions and, particularly, substrate-generated harmonic signal distortions due to coupling with or passing through the semiconductor substrate 211, wherein this coupling is characterized by non-linear capacitive coupling with the semiconductor substrate 211 and/or non-linear resistance through the semiconductor substrate 211 as a function of an inversion charge layer created within the semiconductor substrate 211 near the insulator layer 212. Specifically, as discussed above, with SOI structures, a positive fixed charge can be trapped within the insulator layer 212 and can attract electrons to the interface between the insulator layer 212 and the semiconductor substrate 211, thereby forming an inversion charge layer 240 with a negative charge at that interface. As a result of this inversion charge layer 240, the capacitive coupling between the semiconductor substrate 211 and any of the signal wires 231-235 in the BEOL metal levels M1-MX above the semiconductor layer 213 (or any signal wires in the PC level (not shown)) can be non-linear, thereby causing variations in the source impedance and resulting in the generation of harmonic signal distortions, including second and third order harmonics, at the signal wire outputs. Those skilled in the art will recognize that the magnitude of the non-linear capacitive coupling will vary from signal wire to signal wire as a function of both the signal wire's distance to the insulator layer 212 and also as a function of the dimensions (e.g., length and width) of that signal wire. Harmonic signal distortions can similarly occur at the output of devices 221 or 222 in the semiconductor layer 213 of the IC 200 due to device-to-device coupling characterized by both non-linear capacitive coupling of the semiconductor devices 221 and 222 to the semiconductor substrate 211 and non-linear resistance through the portion of the semiconductor substrate 211 between the semiconductor devices 221 and 222.

In the method, a model library can also be stored in the memory. The model library can include multiple level-specific signal distortion models, which were previously empirically determined for the specific technology node. Each of these level-specific signal distortion models can be specific to circuit elements in a specific one of the multiple different levels of the IC above the semiconductor substrate. That is, each level-specific signal distortion model can be associated with a different level of the IC above the semiconductor substrate. Thus, for example, referring to again to FIG. 2, the model library may contain a signal distortion model for any signal wires in M1 (e.g., signal wire 231), another signal distortion model for any signal wires in M2 (e.g., see signal wire 232), yet another signal distortion model for any signal wires in M3 (e.g., see signal wires 233 and 234) and so on. The model library may also contain signal distortion models corresponding to different types of devices in the semiconductor layer as well as device components or signal wires in the PC layer.

Figure 3:
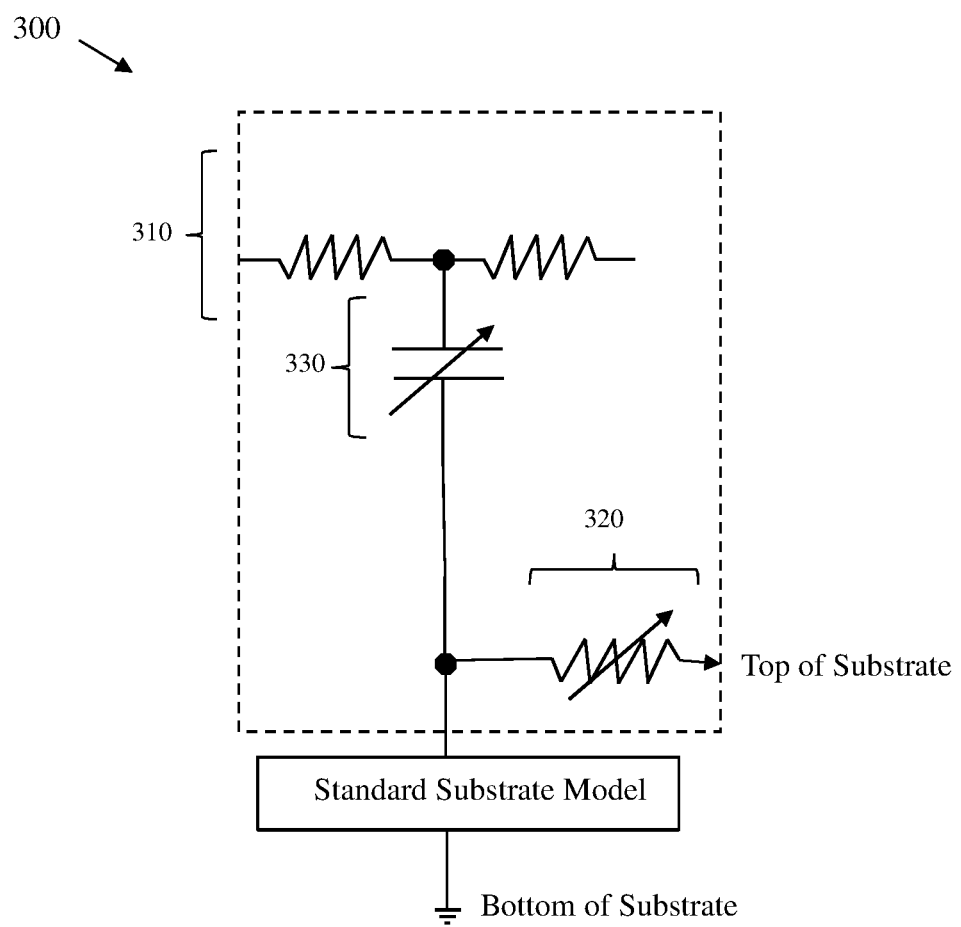
FIG. 3 illustrates an exemplary schematic representation that accounts for substrate-generated harmonic signal distortions at the output of a signal wire in a given BEOL metal or the polysilicon (PC) level.

Each level-specific signal distortion model can include a schematic representation that accounts for substrate-generated signal distortions (e.g., substrate-generated harmonic signal distortions) that will occur on a signal at the output of a circuit element within that specific level of the IC. For example, FIG. 3 illustrates an exemplary schematic representation that accounts for substrate-generated harmonic signal distortions at the output of a signal wire in a given level within the IC, such as a given BEOL metal level (e.g., M1, M2, M3 . . . MX) or the PC level. The schematic representation 300 includes a first resistor 310 corresponding to the resistance of a signal wire in the given BEOL metal level or the PC level. This first resistor 310 has a fixed resistance or, more particularly, a resistance that is independent of the signal voltage. The schematic representation further includes a second resistor 320 that corresponds to the resistance of the inversion charge layer in a portion of the semiconductor substrate that is aligned below the first resistor 310 and that extends essentially vertically toward a top surface of the semiconductor substrate. This second resistor 320 has a non-linear variable resistance and, particularly, a resistance that exhibits non-linear variations as a function of changes in the magnitude of the charge (which, as mentioned above, is voltage-dependent). Finally, this schematic representation 300 includes a capacitor 330 that is formed given the relative positions of the first resistor 310, the second resistor 320 and the insulator layer between the first resistor 310 (i.e., the signal wire) and the second resistor 320. This capacitor 330 has non-linear variable capacitance and, particularly, a capacitance that exhibits non-linear variations as a function of changes in the magnitude of the charge (which, as mentioned above, is voltage-dependent).

It should be noted that each of the level-specific signal distortion models could have essentially the same schematic structure as the schematic structure shown in FIG. 3 and described in detail above. However, the values of the electrical properties associated with the different resistive and capacitive components 310, 320, 330 within that structure will vary from model to model and, particularly, will vary depending upon the given level (e.g., BEOL or PC) of the signal wire within the IC. For example, each level-specific signal distortion model can be developed for a signal wire that is composed of predefined conductive materials (which can, for example, be specified in the technology files for the specific technology node) and that has predefined dimensions including a wire width (which can, for example, be specified in the technology files for the specific technology node), a wire thickness (which can also be specified in the technology files for the specific technology node), and a model developer-selected wire length (e.g., 1 μm, 10 μm, 100 μm, etc.). Each level-specific signal distortion model can further specify the electrical properties associated with the resistive and capacitive components associated with the schematic structure (i.e., the fixed resistance of the first resistor 310, which is independent of the signal voltage; the non-linear variable resistance of the second resistor 320; and the non-linear variable capacitance of the capacitor 330). These electrical properties will vary due to the separation distance between the given level and the semiconductor substrate and can be determined as a function of various factors including, but not limited to, the electrical properties of the conductive materials used for the signal wire, the predefined dimensions of the signal wire, the electrical properties of the insulator layer (or any other dielectric layers between the given level and the semiconductor substrate), the thickness of the insulator layer, and the separation distance between the given level and the semiconductor substrate.

It should further be noted that the level-specific signal distortion models described above can be scalable. For example, although each level-specific signal distortion model is developed for a signal wire with predefined dimensions (as discussed above), if a signal wire in a given level of the IC has different dimensions (e.g., larger dimensions or smaller dimensions) than the predefined dimensions (e.g., a wire width that is x times larger than the predefined wire width and/or a wire length that is y times larger than the model developer-selected wire length or a wire width that is m times smaller than the predefined wire width and/or a wire length that is n times smaller than the model developer-selected wire length), then the level-specific signal distortion model can be scaled accordingly to account for the different dimensions. That is, the predefined model developer-selected wire length can be dynamically overridden through the capability of the processor, thereby allowing the new parameter value to be passed to the associated schematic representation parameter and allowing the model to be executed with this new parameter value, as described in greater detail below.

It should further be noted that the level-specific signal distortion models described above can be empirically determined. For example, one or more test wafers can be formed in the specific technology node at issue such that devices are present in active regions in the semiconductor layer and signal wires are present within the different levels of the IC (e.g., the different BEOL metal levels and the PC level). Using the test wafer(s), nonlinear capacitance can be measured directly by measuring the capacitance across the insulator layer (e.g., the buried oxide layer) using standard techniques and the nonlinear resistance of the substrate can also be measured. Additionally, test signals can be applied to the inputs of the devices/the signal wires. Then, output signals can be captured at the outputs of the devices/signal wires and the output signals can be subjected to full harmonic analyses, including measuring of the fundamental frequency tone and harmonics. Techniques for capturing an output signal and performing a full harmonic analysis on that output signal are well known in the art. Thus, the details of such techniques are omitted from the specification in order to allow the reader to focus on the salient aspects of the disclosed embodiments. After the harmonic analyses are performed, the level-specific signal distortion models can be developed for devices and signal wires in the different levels using the results of the harmonic analyses. For example, using regression and correlation analysis techniques, each level-specific signal distortion model, including the resistance of the first resistor 310, the non-linear variable resistance of the second resistor 320 and the non-linear variable capacitance of the capacitor 330, for signal wires in each given level can be developed based on the results of the harmonic analyses performed on output signals captured from signal wires in that given level of the test wafers and further based on the various factors mentioned above (e.g., the electrical properties of the conductive materials used for the signal wires in that given level, the predefined dimensions of the signal wires, the electrical properties of the insulator layer (or any other dielectric layers between the given level and the semiconductor substrate), the thickness of the insulator layer, the separation distance between the signal wires in the given level and the semiconductor substrate, etc.).

Referring again to FIG. 1, in the method, a parasitic extraction process can be performed (e.g., by a processor in communication with the memory) in order to generate a layout-extracted netlist and store that netlist in memory (106). As in conventional parasitic extraction processes, this layout-extracted netlist can be generated so that it accounts for design features including, but not limited to, all input nodes that supply inputs to the IC, all output nodes that receive outputs from the IC, all power supply nodes (e.g., VDD and ground nodes) connected to the IC, all circuit elements (e.g., library elements and/or customized elements representing one or more devices and the interconnects between the devices, signal wires in the BEOL metal levels and polysilicon (PC) level, etc.) within the IC, etc. As in conventional parasitic extraction processes, this layout-extracted netlist can further be generated so that it accounts for various parasitics (e.g., various parasitic capacitances and resistances) within the IC. Finally, this layout-extracted netlist can further be generated based on the IC design layout and using the model library so that it accounts for substrate-generated signal distortions (e.g., substrate-generated harmonic signal distortions) that occur within the IC.

Specifically, the process 106 of generating the layout-extracted netlist can include analyzing the IC design layout (107). The IC design layout can be analyzed in order to identify the design features and the various parasitics that are to be represented in the layout-extracted netlist. Techniques for analyzing a design layout to identify design features and parasitics using a parasitic extraction tool are well known in the art and, thus, the details are omitted from the specification in order to allow the reader to focus on the salient aspects of the disclosed invention. Additionally, the IC design layout can be analyzed to identify any circuit elements with output signals that are subject to signal distortions due to non-linear capacitive coupling with the semiconductor substrate or through the semiconductor substrate as well as the corresponding levels within the IC of those identified circuit elements. For example, specific signal wires subject to non-linear signal wire-to-substrate capacitive coupling can be identified along with the specific levels (e.g., BEOL metal or PC) of those signal wires, respectively. Additionally, semiconductor devices with active regions in the semiconductor layer and subject to non-linear device-to-device capacitive coupling through the semiconductor substrate can also be identified. Next, signal distortion models for the identified circuit elements (i.e., for the circuit elements identified at process 107) can be selected from the model library based on the corresponding levels (109). For example, for a specific signal wire that is identified at process 107 and determined to be in a specific level within the IC (e.g., a specific one of the BEOL metal levels or the PC level), the level-specific signal distortion model associated with that specific level would be selected from the model library. The selected signal distortion models (i.e., the signal distortion models selected at process 109) can then be scaled, if necessary (111). That is, if an identified circuit element has different dimensions (e.g., larger dimensions or smaller dimensions) than the predefined dimensions used to develop the selected signal distortion model for that circuit element, then the selected signal distortion model can be scaled accordingly to account for the larger or smaller dimensions. For example, if a signal wire that is identified at process 107 has a wire width that is x times larger than the predefined wire width and/or a wire length that is y times larger than the model developer-selected wire length used in the development of the selected signal distortion model for that signal wire, then the selected signal distortion model can be scaled accordingly. Similarly, if a signal wire that is identified at process 107 has a wire width that is m times smaller than the predefined wire width and/or a wire length that is n times smaller than the model developer-selected wire length used in the development of the selected signal distortion model for that signal wire, then the selected signal distortion model can be scaled accordingly. Next, the identified parasitics (i.e., the resistive and capacitive parasitic elements identified at process 107) and the selected signal distortion models (as scaled, if necessary) can be incorporated into the layout-extracted netlist (113).

Those skilled in the art will recognize that conventional parasitic extraction tools identify various different resistive and capacitive parasitic elements and incorporate them into a layout-extracted netlist. These include parasitic capacitive elements with fixed capacitance values representing signal wire-to-substrate capacitances and device-to-device capacitances and a fixed resistance value representing substrate resistance. In the embodiments disclosed herein such capacitive parasitic elements are replaced with the selected signal distortion models.

After the layout-extracted netlist is generated and stored in memory, simulations can be performed (e.g., by the processor) using this layout-extracted netlist (114). The simulations (e.g., simulation program with integrated circuit emphasis (SPICE) simulations) can be performed, for example, over the full range of operating temperatures and over the full range of operating supply voltages. Based on the results of these simulations, a performance model of the IC can be generated and stored in memory (116). This performance model can predict the performance characteristics of the IC including, for example, behavior characteristics, current-voltage (I-V) characteristics, etc. Due to the layout-extracted netlist, which is used during the simulations and which includes the selected signal distortion models, the behavior characteristics predicted by the performance model can include any harmonic signal distortions that will occur at the outputs of any circuit elements (e.g., signal wires, devices) identified at process 107 above.

Then, based on this performance model, a determination can be made as to whether or not performance specifications (e.g., requirements for behavior characteristics, requirements for current-voltage (I-V) characteristics, requirements setting limits on harmonics, etc.) for the IC have been met (118). If one or more of the performance specifications including, but not limited to, the requirements setting limits on harmonics, have not been meet, design adjustments can be made and the processes 104-118 can be iteratively repeated until the performance specifications are met. When the IC meets each performance requirement, the current IC design layout can be stored as the final IC design layout (120). Those skilled in the art will recognize that one or more other verification processes (e.g., timing and signal integrity verification, physical verification, electromigration fails and voltage drop verification, etc.) may, optionally, be performed prior to completion of the final IC design layout. Once the final IC design layout is completed and stored in memory, it can be released to manufacturing. That is, IC chips can be manufactured according to the design set forth in the final IC design layout.

Figure 4:
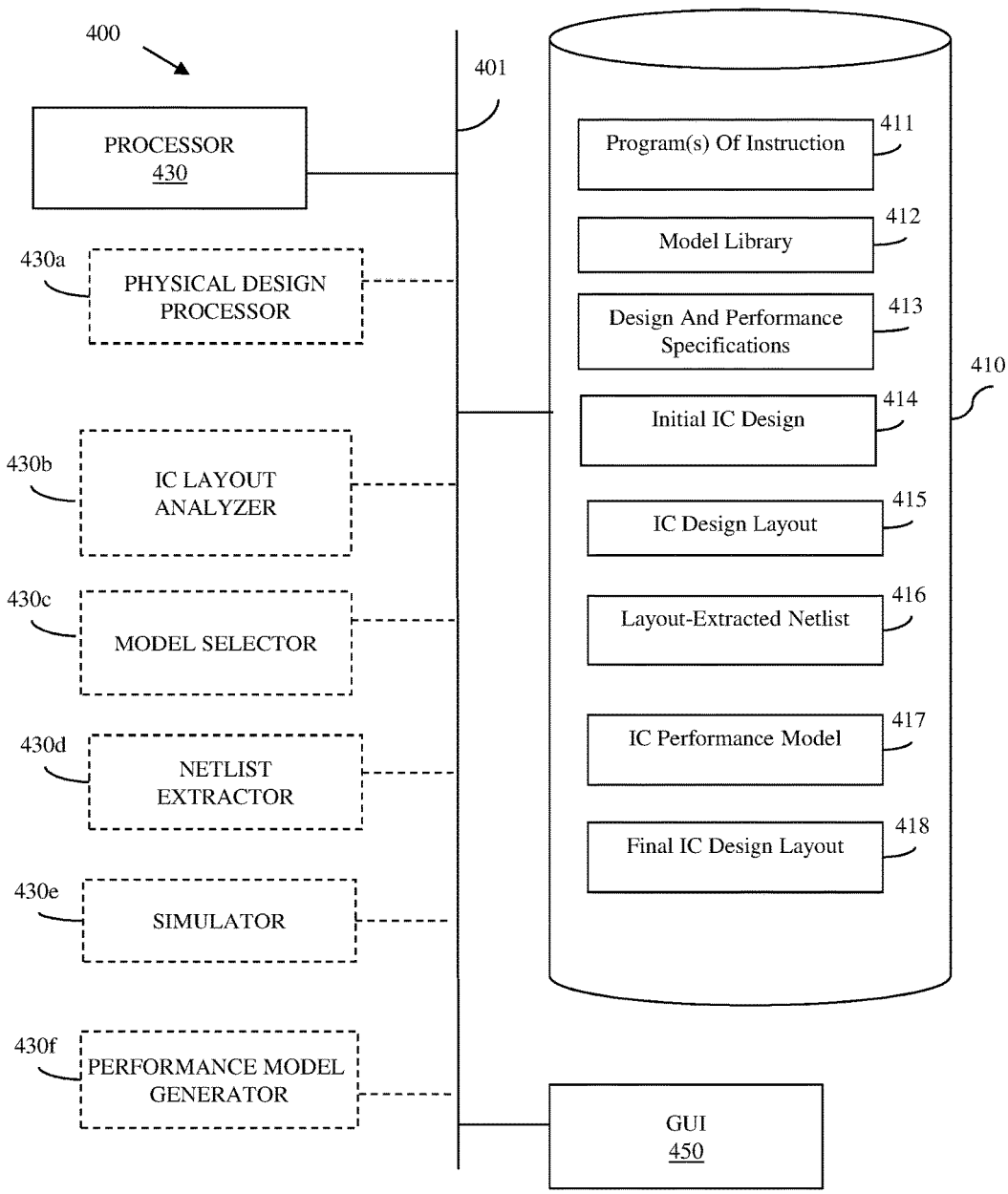
FIG. 4 is a schematic diagram of an integrated circuit (IC) design system that provides for substrate-generated signal distortion-aware IC performance modeling; and, FIG. 5 is a schematic diagram illustrating a representative hardware environment for implementing the embodiments disclosed herein.

Referring to FIG. 4, also disclosed herein is an integrated circuit (IC) design system that provides for substrate-generated signal distortion-aware IC performance modeling. The design system 400 can be a computer-aided design (CAD) system and, specifically, can incorporate at least one memory 410 (e.g., at least one computer readable storage medium, such as a computer readable storage device) that stores program(s) 411 of instructions and other information, a user interface 450 (e.g., a graphic user interface (GUI)) and at least one processor (e.g., 430 or 430a-f, see detailed discussion below). Components of the design system 400, including the processor(s), memory(ies) and GUI, can be interconnected over a system bus 401, as illustrated. Alternatively, any one or more of the components of the design system 400 can communicate with any other component over a wired or wireless network.

The at least one processor can be a single specialized processor 430 (e.g., a single specialized computer processing unit) that, during IC design, performs (i.e., that is adapted to perform, that is configured to perform and/or that executes program(s) 411 of instructions to perform) multiple process steps, as described in detail below. Alternatively, the at least one processor can be multiple specialized processors 430a-f (e.g., multiple different specialized computer processing units) and, during IC design, each processor can perform (i.e., can be adapted to perform, can be configured to perform and/or can execute one or more specific program(s) 411 of instructions to perform) one or more of the multiple process steps, as described in detail below. For purposes of illustration, six different special purpose processors are shown in FIG. 4 including a physical design processor 430a, an IC design layout analyzer 430b, a signal distortion model selector 430c, a netlist extractor 430d, a simulator 430e (e.g., a simulation program with integrated circuit emphasis (SPICE) simulator), and an IC performance model generator 430f. However, it should be understood that FIG. 4 is not intended to be limiting and, alternatively, the multiple process steps, as described in detail below, can be performed by any number of one or more processors. For example, as will be appreciated by one skilled in the art, the IC design layout analyzer 430b and the signal distortion model selector 430c could be components of another tool such as a layout-versus schematic (LVS) tool (not shown). Additionally, the IC design layout analyzer 430b and the signal distortion model selector 430c (or the LVS tool) as well as the model library 412 and the netlist extractor 430d could all be components of a Process Design Kit (PDK) (not shown).

In any case, the design system 400 can receive (e.g., can be adapted to receive, can be configured to receive, etc.) design inputs and, particularly, design specifications and performance specifications 413 for an IC in a specific technology node. These design and performance specifications 413 can be received, for example, from a designer via the graphic user interface (GUI) 450 and stored in memory 410. The performance specifications can include, for example, requirements for behavior characteristics, requirements for current-voltage (I-V) characteristics, requirements setting limits on harmonics, etc. Using the GUI 450, the designer can, for example, develop an initial design 414 for the IC. The initial IC design 414 can be represented by a high-level description, which sets out the requirements for the IC chip. The initial IC design 414 can be stored in the memory 410 in, for example, a hardware description language (HDL), such as VHDL or Verilog. Those skilled in the art will recognize that this high-level description will set out specifications for various parameters (e.g., for channel length, channel width, doping, spacer width, etc.).

Following development of the initial IC design, the processor 430 (or, if applicable, the physical design processor 430a) can perform (i.e., can be adapted to perform, can be configured to perform, can execute a program 411 of instructions to perform, etc.) physical design processes required to generate an IC design layout 415 and store that IC design layout 415 in memory 410. These physical design processes can, for example, include, but are not limited to, logic synthesis, floorplanning, power planning and input/output pin placement, library element placement, clock tree synthesis and wire routing. Such physical design processes are well known in the art and, thus, the details of those processes are omitted from this specification in order to allow the reader to focus on the salient aspects of the disclosed system.

The memory 410 can further store a model library 412. As discussed in detail above with regard to the method, this model library 412 can contain multiple level-specific signal distortion models, which were previously empirically determined for the specific technology node. Each of these level-specific signal distortion models can be specific to circuit elements in a specific one of the multiple different levels of the IC above the semiconductor substrate. That is, each level-specific signal distortion model can be associated with a different level of the IC above the semiconductor substrate. Thus, for example, as discussed in detail above with regard to the method, FIG. 2 is a cross-section diagram illustrating a portion of an IC design layout for an exemplary IC 200 that can be designed and processed using the embodiments disclosed herein. The model library 412 may contain a signal distortion model for any signal wires in M1 (e.g., signal wire 231), another signal distortion model for any signal wires in M2 (e.g., see signal wire 232), yet another signal distortion model for any signal wires in M3 (e.g., see signal wires 233 and 234) and so on. The model library 412 may also contain signal distortion models corresponding to different types of devices in the semiconductor layer and PC layer.

Each level-specific signal distortion model can include a schematic representation that accounts for substrate-generated signal distortions (e.g., substrate-generated harmonic signal distortions) that will occur on a signal at the output of a circuit element within that specific level of the IC. For example, FIG. 3 illustrates an exemplary schematic representation that accounts for substrate-generated harmonic signal distortions at the output of a signal wire in a given level within an IC, such as a given BEOL metal level (e.g., M1, M2, M3 . . . MX) or the PC level. The schematic representation 300 includes a first resistor 310 corresponding to the resistance of a signal wire in the given BEOL metal level or the PC level. This first resistor 310 has a fixed resistance and, more particularly, a resistance that is independent of the signal voltage. The schematic representation further includes a second resistor 320 corresponding to the resistance of the inversion charge layer in a portion of the semiconductor substrate that is aligned below the first resistor 310 and that extends essentially vertically toward a top surface of the semiconductor substrate. This second resistor 320 has a non-linear variable resistance and, particularly, a resistance that exhibits non-linear variations as a function of changes in the magnitude of the charge (which, as mentioned above, is voltage-dependent). Finally, this schematic representation 300 includes a capacitor 330 that is formed given the relative positions of the first resistor 310, the second resistor 320 and the insulator layer between the first resistor 310 (i.e., the signal wire) and the second resistor 320. This capacitor 330 has non-linear variable capacitance and, particularly, a capacitance that exhibits non-linear variations as a function of changes in the magnitude of the charge (which, as mentioned above, is voltage-dependent).

Each of the level-specific signal distortion models described above and contained in the model library 412 can have essentially the same schematic structure as the schematic structure shown in FIG. 3. However, the values of the electrical properties associated with the different resistive and capacitive components 310, 320, 330 within that structure will vary from model to model and, particularly, will vary depending upon the given level of the IC (see the more detailed description of the schematic structure of the models in the discussion of the method above). Each of the level-specific signal distortion models described above and contained in the model library 412 can further be scalable (see the more detailed description of the scalability of the models in the discussion of the method above). Finally, each of the level-specific signal distortion models described above and contained in the model library 412 can be empirically determined (see the more detailed description of the development of the models in the discussion of the method above).

The processor 430 (or, if applicable, the IC design layout analyzer 430b, the model selector 430c and the netlist extractor 430d in combination) can perform (i.e., can be adapted to perform, can be configured to perform, and/or can execute a program 411 of instructions to perform) a parasitic extraction process in order to generate a layout-extracted netlist 416 and store that netlist 416 in the memory 410. As in conventional parasitic extraction processes, this layout-extracted netlist 416 can be generated so that it accounts for design features including, but not limited to, all input nodes that supply inputs to the IC, all output nodes that receive outputs from the IC, all power supply nodes (e.g., VDD and ground nodes) connected to the IC, all circuit elements (e.g., library elements and/or customized elements representing one or more devices and the interconnects between the devices, signal wires in the BEOL metal levels and PC level, etc.) within the IC, etc. As in conventional parasitic extraction processes, this layout-extracted netlist 416 can further be generated so that it accounts for various parasitics (e.g., various parasitic capacitances and resistances) within the IC. Finally, this layout-extracted netlist 416 can further be generated based on the IC design layout and using the model library so that it accounts for substrate-generated signal distortions (e.g., substrate-generated harmonic signal distortions) that occur within the IC.

More specifically, the processor 430 (or, if applicable, the IC design layout analyzer 430b) can analyze the IC design layout 415 in order to identify the design features and the various parasitics that are to be represented in the layout-extracted netlist. Techniques for analyzing a design layout to identify design features and parasitics using a parasitic extraction tool are well known in the art and, thus, the details are omitted from the specification in order to allow the reader to focus on the salient aspects of the disclosed embodiments. The processor 430 (or, if applicable, the IC design layout analyzer 430b) can further analyze the IC design layout 415 to identify any circuit elements with output signals that are subject to signal distortions due to coupling with or passing through the semiconductor substrate 211, wherein this coupling is characterized by non-linear capacitive coupling with the semiconductor substrate and/or non-linear resistance through the semiconductor substrate as well as the corresponding levels within the IC of those identified circuit elements. For example, specific signal wires subject to non-linear signal wire-to-substrate capacitive coupling can be identified along with the specific levels (BEOL metal or PC) within the IC of those signal wires, respectively. Additionally, semiconductor devices with active regions in the semiconductor layer and subject to non-linear device-to-device capacitive coupling through the semiconductor substrate can also be identified. Next, the processor 430 (or, if applicable, the model selector 430c) can select, from the model library 412, signal distortion models for the identified circuit elements based on the corresponding levels. For example, for a specific signal wire, which is identified as having an output signal that may be subject to signal distortion and which is determined to be in specific level, the level-specific signal distortion model associated with that specific level can be selected from the model library 412. The processor 430 (or, if applicable, the model selector 430c) can further scale the selected signal distortion models, if necessary. That is, if an identified circuit element has larger or smaller dimensions than the predefined dimensions used to develop the selected signal distortion model for that circuit element, then the selected signal distortion model can be scaled accordingly to account for the larger or smaller dimensions. For example, if a signal wire, which is identified as having an output signal that may be subject to signal distortion, has a wire width that is x times larger than the predefined wire width and/or a wire length that is y times larger than the model developer-selected wire length used in the development of the selected signal distortion model for that signal wire, then the selected signal distortion model can be scaled accordingly. Similarly, if a signal wire, which is identified as having an output signal that may be subject to signal distortion, has a wire width that is m times smaller than the predefined wire width and/or a wire length that is n times smaller than the model developer-selected wire length used in the development of the selected signal distortion model for that signal wire, then the selected signal distortion model can be scaled accordingly. Next, the processor 430 (or, if applicable, the netlist extractor 430*d*) can incorporate the identified parasitics and the selected signal distortion models (as scaled, if necessary) into the layout-extracted netlist 416 and store that netlist 416 in memory 410.

Those skilled in the art will recognize that conventional parasitic extraction tools identify various different resistive and capacitive parasitic elements and incorporate them into a layout-extracted netlist. These include parasitic capacitive elements with fixed capacitance values representing signal wire-to-substrate capacitances and device-to-device capacitances and a fixed resistance value representing substrate resistance. In the embodiments disclosed herein such capacitive parasitic elements are replaced with the selected signal distortion models.

The processor 430 (or, if applicable, the simulator 430*e*) can then perform simulations using this layout-extracted netlist 416. The simulations (e.g., simulation program with integrated circuit emphasis (SPICE) simulations) can be performed, for example, over the full range of operating temperatures and over the full range of operating supply voltages. Based on the results of these simulations, the processor 430 (or, if applicable, the performance model generator 4300 can generate a performance model 417 of the IC and store that IC performance model 417 in memory 410. This performance model 417 can predict the performance characteristics of the integrated circuit including, for example, behavior characteristics, current-voltage (I-V) characteristics, etc. Due to the layout-extracted netlist 416, which is used during the simulations and which includes the selected signal distortion models, the behavior characteristics predicted by the performance model 417 can include any harmonic signal distortions that will occur at the outputs of various circuit elements (e.g., signal wires, devices).

Based on this performance model, a determination can be made (e.g., by a designer or automatically by the processor 430) as to whether or not performance specifications 413 (e.g., requirements for behavior characteristics, requirements for current-voltage (I-V) characteristics, requirements setting limits on harmonics, etc.) for the IC have been met. If one or more of the performance specifications 413 including, but not limited to, the requirements setting limits on harmonics, have not been meet, design adjustments can be made (e.g., by the processor 430 or, if applicable, the physical design processor 430*a*) and the processes described above can be iteratively repeated until the performance specifications are met. When the IC meets each performance requirement, the current IC design layout can be stored as the final IC design layout 418 in the memory 410. Those skilled in the art will recognize that one or more other verification processes (e.g., timing and signal integrity verification, physical verification, electromigration fails and voltage drop verification, etc.) may, optionally, be performed prior to completion of the final IC design layout. Once the final IC design layout 418 is completed and stored in memory, it can be released to manufacturing. That is, IC chips can be manufactured according to the design set forth in the final IC design layout.

Also disclosed herein is a computer program product. This computer program product can include a computer readable storage medium with program instructions embodied therewith (e.g., stored thereon). The program instructions can be executable by a processor to cause the processor to perform the above-described method. More particularly, the present invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which has one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
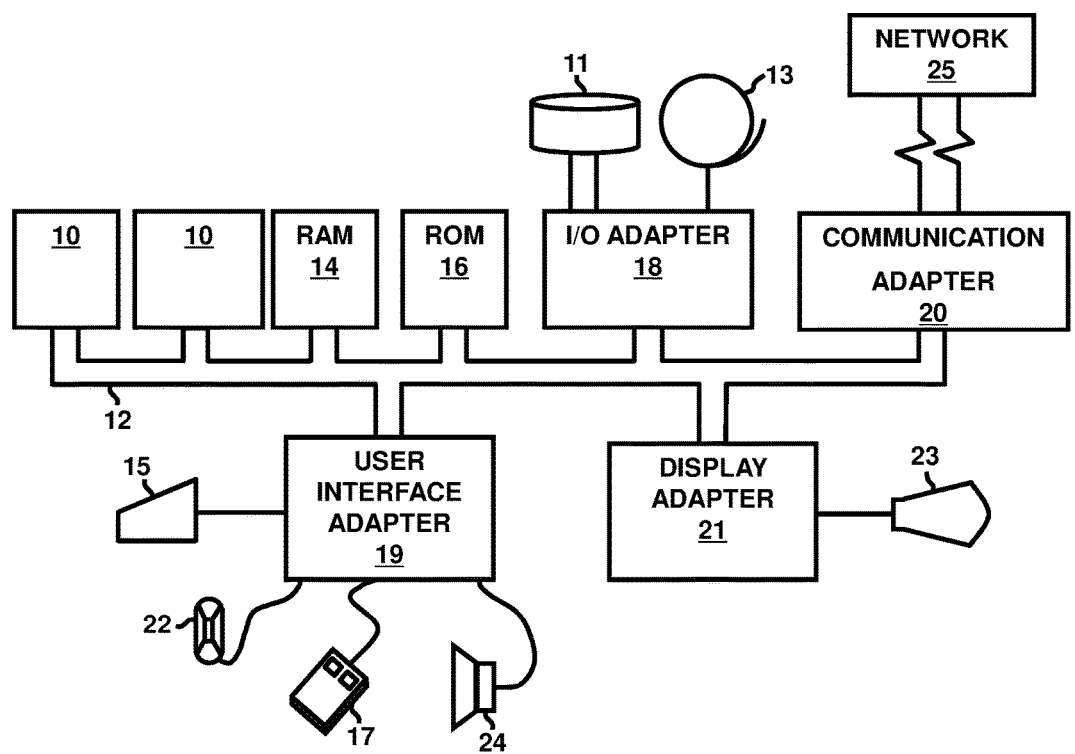

A representative hardware environment (i.e., a computer system) for implementing the systems, methods and computer program products disclosed above is depicted in FIG. 5. This schematic drawing illustrates a hardware configuration of an information handling/computer system in accordance with the embodiments herein. The system incorporates at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed methods, systems and computer program products and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are embodiments of a method, system and computer program product for modeling the performance of an integrated circuit (IC). In these embodiments, a parasitic extraction process can be performed to generate a layout-extracted netlist that, not only accounts for various parasitics (e.g., various parasitic capacitances and resistances) within the IC, but also accounts for substrate-generated signal distortions (e.g., substrate-generated harmonic signal distortions) that occur within the IC. Specifically, during the netlist extraction process, the design layout of the IC can be analyzed to identify parasitics that are to be represented in the layout-extracted netlist and to also identify any circuit elements with output signals that are subject to substrate-generated signal distortions. When such circuit elements are identified, signal distortion models, which were previously empirically determined and stored in a model library, which correspond to the identified circuit elements, and which account for the signal distortions, can be selected from the model library and incorporated into the layout-extracted netlist. Simulations can subsequently be performed using this layout-extracted netlist to generate a performance model for the IC. These embodiments allow designers to capture an accurate assessment of substrate-generated signal distortions that will occur in a given design and to make localized design modifications to avoid such signal distortions. Thus, designers can use conventional SOI wafers instead of highly processed, more expensive, SOI wafers that contain features intended to minimize substrate-generated signal distortions. This is particularly helpful in radio frequency (RF) switch applications because of the limits on harmonics specified by the Federal Communications Commission (FCC).

What is claimed is:

1. A method comprising:

accessing, by a processor from a memory, a design layout for an integrated circuit on a semiconductor substrate and a model library with multiple level-specific signal distortion models;

generating, by the processor, a layout-extracted netlist for the integrated circuit, the generating of the layout-extracted netlist comprising:

analyzing the design layout to identify circuit elements with outputs, wherein output signals at the outputs are subject to signal distortions due to coupling with or passing through the semiconductor substrate and to further identify corresponding levels of the circuit elements within the integrated circuit;

selecting, from the model library, signal distortion models for the circuit elements, respectively, based on the corresponding levels in order to account for the signal distortions, wherein each specific signal distortion model comprises a specific schematic representation that accounts for substrate-generated signal distortions that occur at an output of a specific circuit element within a specific integrated circuit level and wherein each specific signal distortion model comprises:

a first resistor representing a first resistance of the circuit element;

a second resistor representing a second resistance of an inversion charge layer in a portion of the semiconductor substrate aligned below the first resistor; and a capacitor representing a capacitance exhibited by the first resistor, the second resistor and an insulator between the first resistor and the second resistor; and, incorporating the signal distortion models into the layout-extracted netlist;

performing, by the processor, simulations using the layout-extracted netlist to generate a performance model of the integrated circuit; and determining, by the processor based on the performance model, whether the integrated circuit meets at least one performance requirement, wherein, when the integrated circuit fails to meet the performance requirement, the method further comprises modifying the design layout and repeating the generating of the layout-extracted netlist, the performing of the simulations and the determining of whether the integrated circuit meets the at least one performance requirement, and wherein, when the integrated circuit meets the at least one performance requirement, the method further comprises releasing the design layout as a final design layout and manufacturing integrated circuit chips according to the final design layout.

2. The method of claim 1, the coupling being characterized by at least one of non-linear capacitive coupling to the semiconductor substrate and non-linear resistance through the semiconductor substrate.

3. The method of claim 1, further comprising, before the incorporating of the signal distortion models into the layout-extracted netlist, scaling any signal distortion model for any circuit element having dimensions that are larger than predefined dimensions used to develop the signal distortion model.

4. The method of claim 1, the integrated circuit being designed at a specific technology node and the multiple level-specific signal distortion models being determined empirically using a test wafer produced for the specific technology node.

5. The method of claim 1, the semiconductor substrate comprising a semiconductor-on-insulator substrate such that an insulator layer is positioned between the circuit elements and the semiconductor substrate and an inversion charge layer is created in the semiconductor substrate adjacent to an interface between the insulator layer and the semiconductor substrate.

6. The method of claim 5, the circuit elements being signal wires in different levels above a semiconductor layer on the insulator layer and each of the multiple level-specific signal distortion models in the model library being associated with a corresponding one of the different levels.

7. The method of claim 1, the first resistor having a fixed resistance, the second resistor having a non-linear variable resistance that is voltage-dependent; and the capacitor having a non-linear variable capacitance that is voltage-dependent.

8. A system comprising:

a memory storing a design layout for an integrated circuit on a semiconductor substrate and a model library with multiple level-specific signal distortion models; and, a processor in communication with the memory, the processor generating a layout-extracted netlist for the integrated circuit, the generating of the layout-extracted netlist comprising:

analyzing the design layout to identify circuit elements with outputs, wherein output signals at the outputs are subject to signal distortions due to coupling with or passing through the semiconductor substrate and to further identify corresponding levels of the circuit elements within the integrated circuit;

selecting, from the model library, signal distortion models for the circuit elements, respectively, based on the corresponding levels in order to account for the signal distortions, wherein each specific signal distortion model comprises a specific schematic representation that accounts for substrate-generated signal distortions that occur at an output of a specific circuit element within a specific integrated circuit level and wherein each specific signal distortion model comprises:

a first resistor representing a first resistance of the circuit element;

a second resistor representing a second resistance of an inversion charge layer in a portion of the semiconductor substrate aligned below the first resistor; and a capacitor representing a capacitance exhibited by the first resistor, the second resistor and an insulator between the first resistor and the second resistor; and incorporating the signal distortion models into the layout-extracted netlist, and the processor further:

performing simulations using the layout-extracted netlist to generate a performance model of the integrated circuit;

determining, based on the performance model, whether the integrated circuit meets at least one performance requirement;

when the integrated circuit fails to meet the performance requirement, modifying the design layout and repeating the generating of the layout-extracted netlist, the performing of the simulations and the determining of whether the integrated circuit meets the at least one performance requirement; and when the integrated circuit meets the at least one performance requirement, releasing the design layout as a final design layout and manufacturing integrated circuit chips according to the final design layout.

9. The system of claim 8, the coupling being characterized by at least one of non-linear capacitive coupling with the semiconductor substrate and non-linear resistance through the semiconductor substrate.

10. The system of claim 8, further comprising, before the incorporating of the signal distortion models into the layout-extracted netlist, scaling any signal distortion model for any circuit element having dimensions that are larger than predefined dimensions used to develop the signal distortion model.

11. The system of claim 8, the integrated circuit being designed at a specific technology node and the multiple level-specific signal distortion models being determined empirically using a test wafer produced for the specific technology node.

12. The system of claim 8, the semiconductor substrate comprising a semiconductor-on-insulator substrate such that an insulator layer is positioned between the circuit elements and the semiconductor substrate and an inversion charge layer is created in the semiconductor substrate adjacent to an interface between the insulator layer and the semiconductor substrate.

13. The system of claim 12, the circuit elements being signal wires in different levels above a semiconductor layer on the insulator layer and each of the multiple level-specific signal distortion models in the model library being associated with a corresponding one of the different levels.

14. The system of claim 8,
the first resistor having a fixed resistance,
the second resistor having a non-linear variable resistance that is voltage-dependent, and
the capacitor having a non-linear variable capacitance that is voltage-dependent.

15. A computer program product comprising a computer readable storage medium having program instructions embodied therewith, the program instructions being executable by a processor to cause the processor to perform a method, the method comprising:

accessing, from a memory, a design layout for an integrated circuit on a semiconductor substrate and a model library with multiple level-specific signal distortion models;

generating a layout-extracted netlist for the integrated circuit, the generating of the layout-extracted netlist comprising:

analyzing the design layout to identify circuit elements with outputs, wherein output signals at the outputs are subject to signal distortions due to coupling with or passing through the semiconductor substrate and to further identify corresponding levels of the circuit elements within the integrated circuit;

selecting, from the model library, signal distortion models for the circuit elements, respectively, based on the corresponding levels in order to account for the signal distortions, wherein each specific signal distortion model comprises a specific schematic representation that accounts for substrate-generated signal distortions that occur at an output of a specific circuit element within a specific integrated circuit level and wherein each specific signal distortion model comprises:

a first resistor representing a first resistance of the circuit element;

a second resistor representing a second resistance of an inversion charge layer in a portion of the semiconductor substrate aligned below the first resistor; and a capacitor representing a capacitance exhibited by the first resistor, the second resistor and an insulator between the first resistor and the second resistor; and incorporating the signal distortion models into the layout-extracted netlist;

performing simulations using the layout-extracted netlist to generate a performance model of the integrated circuit;

determining, based on the performance model, whether the integrated circuit meets at least one performance requirement;

when the integrated circuit fails to meet the performance requirement, modifying the design layout and repeating the generating of the layout-extracted netlist, the performing of the simulations and the determining of whether the integrated circuit meets the at least one performance requirement; and when the integrated circuit meets the at least one performance requirement, releasing the design layout as a final design layout and manufacturing integrated circuit chips according to the final design layout.

16. The computer program product of claim 15, the coupling being characterized by at least one of non-linear capacitive coupling with the semiconductor substrate and non-linear resistance through the semiconductor substrate.

17. The computer program product of claim 15, the method further comprising, before the incorporating of the signal distortion models into the layout-extracted netlist, scaling any signal distortion model for any circuit element having dimensions that are larger than predefined dimensions used to develop the signal distortion model.

18. The computer program product of claim 15, the integrated circuit being designed at a specific technology node and the multiple level-specific signal distortion models being determined empirically using a test wafer produced for the specific technology node.

* * * * *